United States Patent [19]
Bamford et al.

[11] Patent Number: 5,832,516
[45] Date of Patent: Nov. 3, 1998

[54] CACHING DATA IN RECOVERABLE OBJECTS

[75] Inventors: Roger J. Bamford, Woodside; Leng Leng Tan, Sunnyvale, both of Calif.

[73] Assignee: Oracle Corporation, Redwood Shores, Calif.

[21] Appl. No.: 784,611

[22] Filed: Jan. 21, 1997

[51] Int. Cl.⁶ .................................................. G06F 17/30
[52] U.S. Cl. .............................................................. 707/202
[58] Field of Search ............................................. 707/202

[56] References Cited

U.S. PATENT DOCUMENTS

| | | | |
|---|---|---|---|
| 5,278,982 | 1/1994 | Daniels et al. | 707/202 |
| 5,287,501 | 2/1994 | Lomet | 707/202 |
| 5,440,727 | 8/1995 | Bhide et al. | 711/117 |
| 5,455,944 | 10/1995 | Haderle et al. | 707/202 |
| 5,465,328 | 11/1995 | Dievendorff et al. | 395/182.13 |
| 5,481,699 | 1/1996 | Saether | 395/182.13 |
| 5,499,367 | 3/1996 | Bamford et al. | 707/8 |
| 5,581,750 | 12/1996 | Haderle et al. | 707/202 |
| 5,640,561 | 6/1997 | Satoh et al. | 707/202 |

*Primary Examiner*—Wayne Amsbury
*Attorney, Agent, or Firm*—McDermott, Will & Emery

[57] ABSTRACT

A method and apparatus for recovering an object that includes logged data and a set of non-logged data is provided. According to the method, a copy of the object resides in volatile memory. A change is made to the copy of the object. If the change does not change any data within the object other than the non-logged data, then the change is made to the copy of the object without generating redo information. If the change changes any data within the object other than the non-logged data, then redo information is generated in response to the change. The redo information is stored on non-volatile storage. After a failure, the redo information is used to restore all data within the object other than the non-logged data. The non-logged data may be restored by retrieving the non-logged data from a different object for which redo information was generated for the non-logged data. A description of how this technique may be used to efficiently perform selective non-deferred block cleanout is also provided.

37 Claims, 7 Drawing Sheets

FIG. 1A (PRIOR ART)

TRANSACTION TABLE 120

| SLOT | SEQUENCE # | STATUS | COMMIT TIME |
|---|---|---|---|
| 0 | 7 | COMMITTED | |
| 1 | 9 | ACTIVE | |
| 2 | 5 | COMMITTED | |
| 3 | 8 | ACTIVE | |
| 4 | 6 | ACTIVE | |

FIG. 1B (PRIOR ART)

DATA BLOCK 108

| TRANSACTION LIST 128 | | | | |
|---|---|---|---|---|
| INDEX | TID | STATUS FLAG | COMMIT TIME | ... |
| • | • | • | • | • |
| • | • | • | • | • |
| • | • | • | • | • |

DATA ITEM 126

CACHING DATA IN RECOVERABLE OBJECTS

FIELD OF THE INVENTION

The present invention relates to data processing systems, and more specifically, to a method and apparatus for caching data in recoverable objects.

BACKGROUND OF THE INVENTION

Most data processing systems include both volatile and non-volatile memory devices. In general, volatile memory devices, such as random access memory, provide faster access times than non-volatile memory devices, such as magnetic and optical disks. However, non-volatile memory is generally less expensive and less susceptible to data loss. Because non-volatile memory is less susceptible to data loss, information that is reflected in data that is stored on non-volatile storage shall be referred to herein as "durably stored" information. Conversely, information that is not yet reflected in data that is stored on non-volatile storage is not "durably stored".

To take advantage of the persistent nature of non-volatile memory, an object, such as a data item in a database system, is typically stored on non-volatile memory until the object is required by a process. To take advantage of the speed of volatile memory, a copy of the object is loaded into volatile memory when the object is required by a process. The process accesses and makes any changes to the copy of the object that resides in the volatile memory. For example, a process updates a data item stored in non-volatile memory by making changes to a copy of the data item that resides in volatile memory. At a later point in time, the copy of the data item may be written back to non-volatile memory.

Due to the nature of volatile memory, various types of failures will cause the information contained in the volatile memory to be lost. If the volatile memory contains copies of data items to which updates have been applied, the updates that were made to the data items may be lost. In many applications, such a loss of information is unacceptable.

Recovery techniques have been developed to avoid the loss of information that may occur due to failures. According to one approach, objects are made "recoverable" whenever it becomes critical for the objects to survive a failure. An object is considered to be "recoverable" when enough information to reconstruct the object after a failure is durably stored.

For example, in database systems it is considered critical that the database reflect changes made by all committed transactions. Therefore, when a transaction commits, the updated versions of the data items that were updated by the transaction must be made recoverable. The updated data items may be made recoverable by writing the updated data items themselves to non-volatile memory. However, writing all data items that were updated by a transaction to non-volatile memory every time a transaction commits has a significant adverse effect on performance.

Therefore, recovery techniques have been developed in which a "redo record" is generated when a transaction makes a change to a data item. The redo record indicates the change that was made by the transaction. When a transaction commits, the redo records generated for changes made by the transaction are durably stored. The durably stored redo record for a change may be used to re-apply the change to the database if the updated data item itself is lost from volatile memory due to a failure.

While generating and durably storing redo records involves less overhead than durably storing entire objects, it still results in some performance reduction. In light of the foregoing, it is desirable to provide a mechanism for making objects recoverable. It is further desirable to avoid the generation and storage of redo records for an update when an object is otherwise recoverable. It is further desirable to avoid the generation of redo information for changes to data that is not critical even when the changes are made to an object that contains some data that is critical.

SUMMARY OF THE INVENTION

A method and apparatus for recovering an object that includes logged data and a set of non-logged data is provided. According to the method, a copy of the object resides in volatile memory. A change is made to the copy of the object. If the change does not change any data within the object other than the non-logged data, then the change is made to the copy of the object without generating redo information. If the change changes any data within the object other than the non-logged data, then redo information is generated in response to the change. The redo information is stored on non-volatile storage. After a failure, the redo information is used to restore all data within the object other than the non-logged data. The non-logged data may be restored by retrieving the non-logged data from a different object for which redo information was generated for the non-logged data.

According to another aspect of the invention, a method and apparatus for performing block cleanout is provided. Block cleanout is deferred or not deferred based on whether a particular data block was written to persistent storage before the updating transaction committed.

Non-deferred block cleanout is performed when a transaction commits. According to one embodiment of the invention, non-deferred block cleanout is performed on all data blocks that were updated by the transaction and that are still in cache memory. According to one aspect of the invention, no redo information is generated in response to performing non-deferred block cleanout. Rather, a flag in the data block is set and a transaction that subsequently uses the unlogged data in the data block generates the redo information for the non-deferred block cleanout operation.

Block cleanout for data blocks that were updated by the transaction and that were written out to persistent storage before the transaction commits is deferred. According to one embodiment, deferred block cleanout is performed by a subsequent transaction that updates the data block.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for caching data in recoverable objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2:
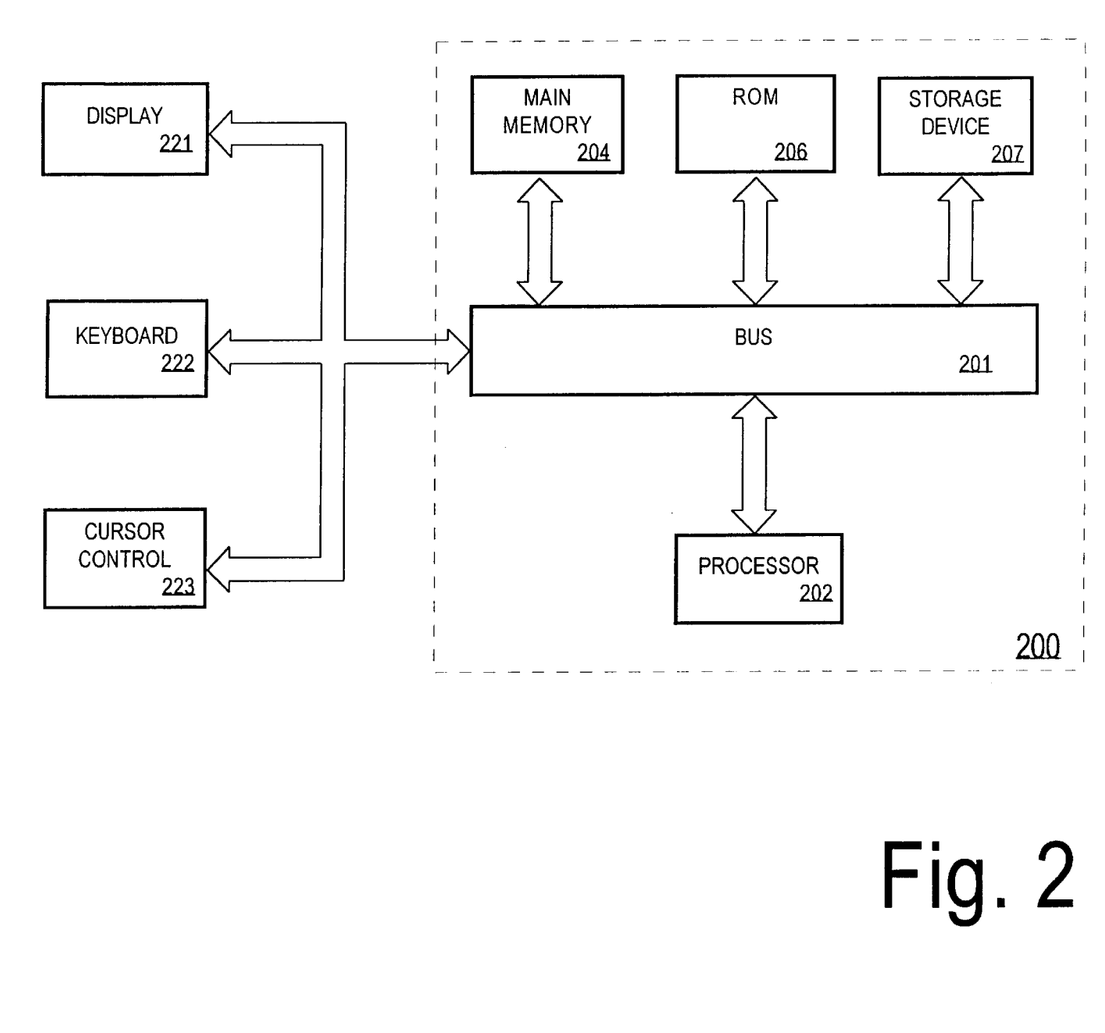
FIG. 2 is a block diagram illustrating a computer system on which an embodiment of the present invention may be implemented.

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to cache data in recoverable objects using the techniques described hereafter. According to one embodiment, these techniques are performed by computer system 200 in response to processor 202 executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

SELECTIVE REDO GENERATION

As mentioned above, an object is recoverable if the object can be reconstructed from data that resides on non-volatile storage. Conventional redo mechanisms generate and durably store redo records to reflect every change made to an object that must be recoverable.

It has been discovered that under certain conditions, an object is recoverable even when no redo record is generated for a change that is made to the object. Specifically, an update that changes data (the "target information") within an object that resides in volatile memory is recoverable even though a redo record for the update was not generated if (1) the update to the target information is already durably stored and (2) the recovery process knows where to look for the update to the target information.

For example, assume that two objects (obj1 and obj2) store a particular statistic. When the statistic changes, both objects are updated. A redo record is generated for the change made to obj1, but not for the change made to obj2. The redo record is durably stored when the transaction that made the change to obj1 commits. If a failure occurs before the updated versions of obj1 and obj2 are durably stored, then the redo record for obj1 can be applied to recover the updated version of obj1. The updated version of obj2 may be recovered by writing the statistic from the recovered version of obj1 into the previous version of obj2.

Note that the statistic common to obj1 and obj2 may be only one of many values contained in obj2. For obj2 to be recoverable, redo records must be generated when any of the other values contained in obj2 are updated, unless those values are also otherwise durably stored.

To recover obj2, the database system must know that the most recent value of the statistic will be reflected in obj1. There are various techniques for ensuring that the recovery process knows where to look for the target information. For example, if two or more recoverable objects will store a particular value, at least one of the recoverable objects may be designated as a "source object" for the value. Source object information, that indicates the source objects for particular sets of data, would be durably stored, or can be part of the program logic.

When the target information is updated in a source object, a redo record is generated. However, when the value is updated in a non-source object, no redo record is generated. After a failure, the source object is recovered based on the redo record. When recovering non-source objects, the recovery process reads the durably stored source object information and recovers the non-source object based on the value stored in the source object.

Another technique for making the recovery process aware of the source objects for particular data items is to designate source objects on an object-type basis. For example, if both object-type 1 and object-type 2 will store a particular data item, object-type 1 may be designated as the source object-type for the data item. When the data item is updated in an object of object-type 1, a redo record is generated. When the data item is updated in an object of object-type 2, a redo record is not generated. After a failure, all objects of object-type 1 are recovered based on redo records. The data item values in the object-type 1 objects are then used during the recovery of object-type 2 objects.

In the techniques described above, redo records do not need to be generated for changes made to the target information in non-source objects. However, under certain conditions, it may be desirable to generate redo records for changes made to the target information in non-source objects. Specifically, when the cost of generating a redo record for a change to target information in a non-source object is low, it may be desirable to generate redo records for the change. For example, if a process makes changes to both the target information and non-target information in a non-source object, a redo record will have to be generated for the change to the non-target information. Because a redo record is already being generated for the change to the non-target information in the object, there is little additional overhead involved in generating the redo record to cover both the change to the target information and the change to the non-target information.

CACHING INFORMATION IN RECOVERABLE OBJECTS

The overhead associated with performing an update to a recoverable object is reduced when redo records do not have to be generated in response to the update. Therefore, a database system that selectively generates redo records as described above may efficiently perform certain updates that would otherwise be inefficient to perform in systems that generate redo records for all changes made to recoverable objects.

According to one embodiment of the invention, the database system uses a portion of an object as a cache for information that is available from an alternative (but less convenient) source objects. For example, assume that a process that uses an object has access to certain information that may be useful to subsequent processes that will use the object. The process writes the information into a "cache" portion of the object without generating a redo record of the change. Subsequent processes that access the object read the information from the cache within the object. Retrieving the information from the object may be significantly less expensive than retrieving the information from some other location at which it is durably stored.

If the version of the object that contains the information is lost due to a failure, subsequent processes simply retrieve the information from the source object. Optionally, one of the subsequent processes can restore the cache by reading the information from the source object and writing the information back into the object after a failure. A redo record does not ever need to be generated to reflect the contents of the cache. However, a redo record may optionally be generated so that the cache may be restored as part of the recovery process after a failure based on a redo record rather than having to locate and read the source object.

EXEMPLARY APPLICATION

The techniques described above for performing selective redo record generation and for caching data in a recoverable object have numerous applications. One such application involves caching commit time information in data blocks during non-deferred block cleanout operations. An embodiment that uses the techniques described above during block cleanout shall be described in greater detail hereafter. However, this embodiment is merely exemplary. The present invention is not limited to any particular embodiment.

In typical database systems, the data contained in the database is stored in data blocks on one or more disks. In addition to the actual user data, these data blocks contain a list of transactions that have recently made changes to the data block. The list of transactions that have recently made changes to a data block is referred to as the "transaction list" of the data block. An exemplary data block 108 is shown in detail in FIG. 1C. Data block 108 includes a transaction list 128 and a data item 126.

Figure 1A:
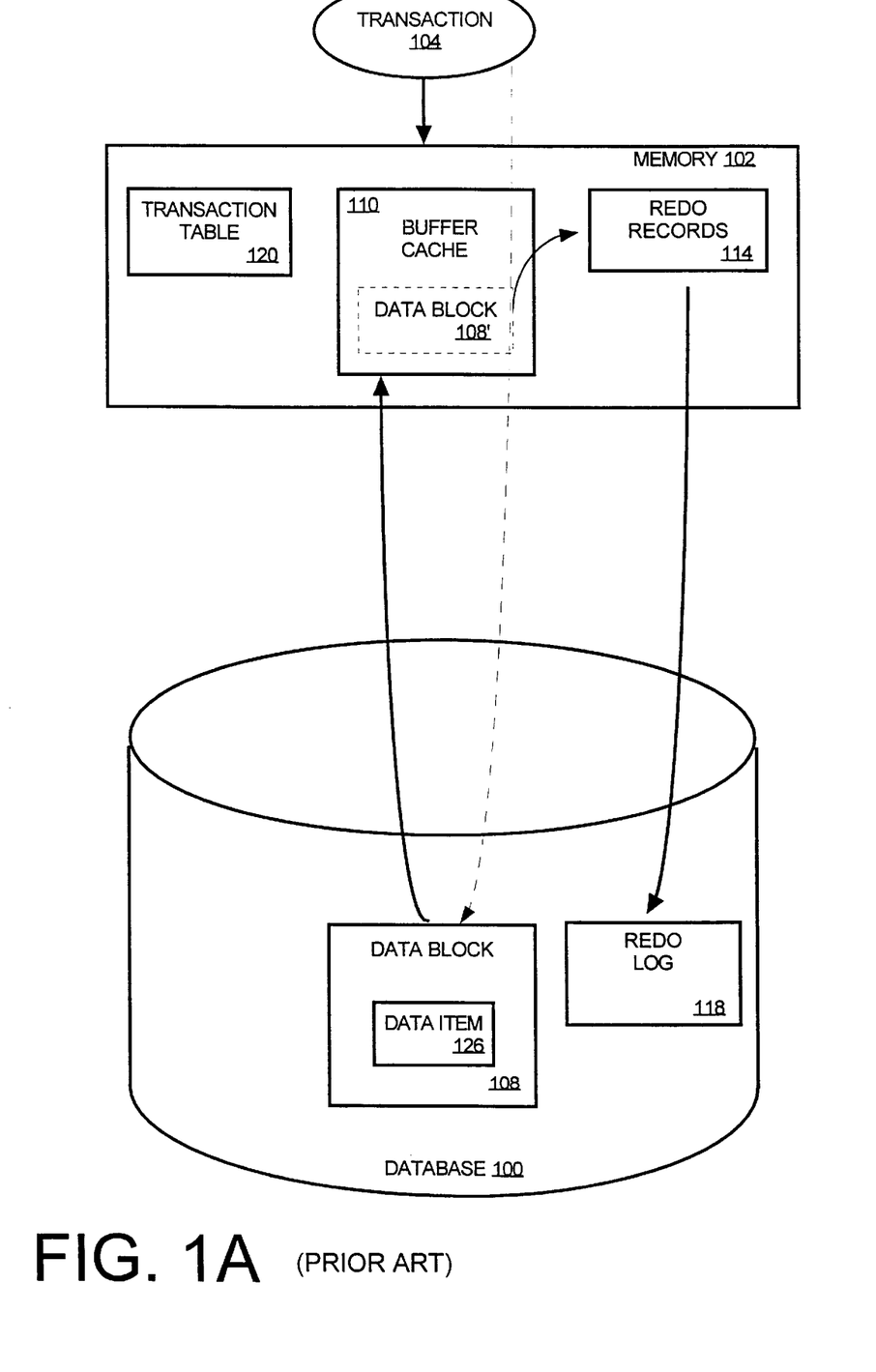
FIG. 1A is a block diagram that illustrates an update operation in a database system that has a redo-based recovery mechanism.
Figure 1B:
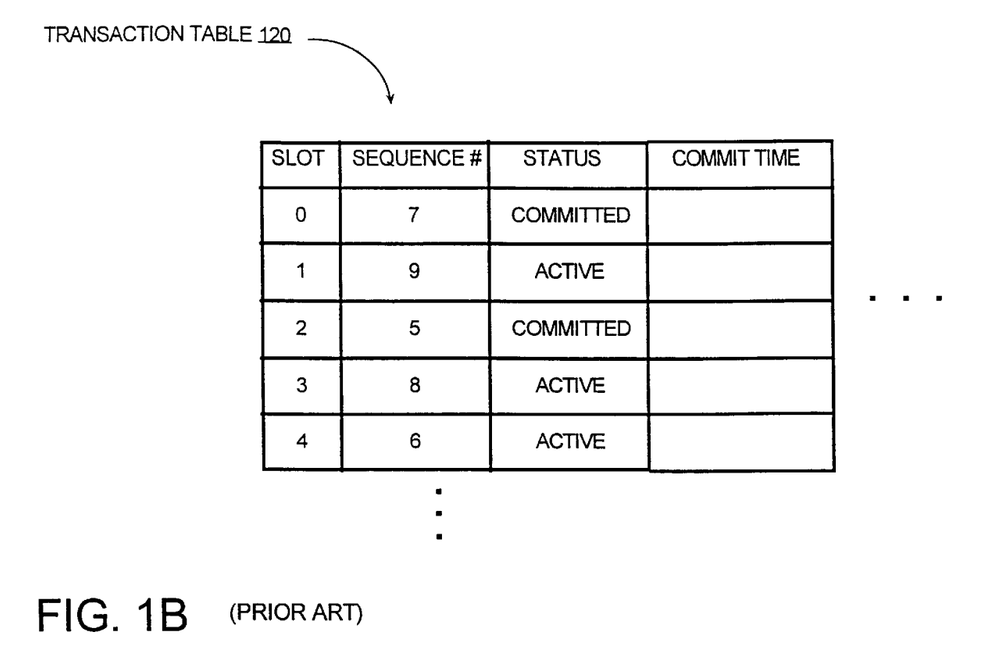
FIG. 1B is a block diagram illustrating a transaction table.
Figure 1C:
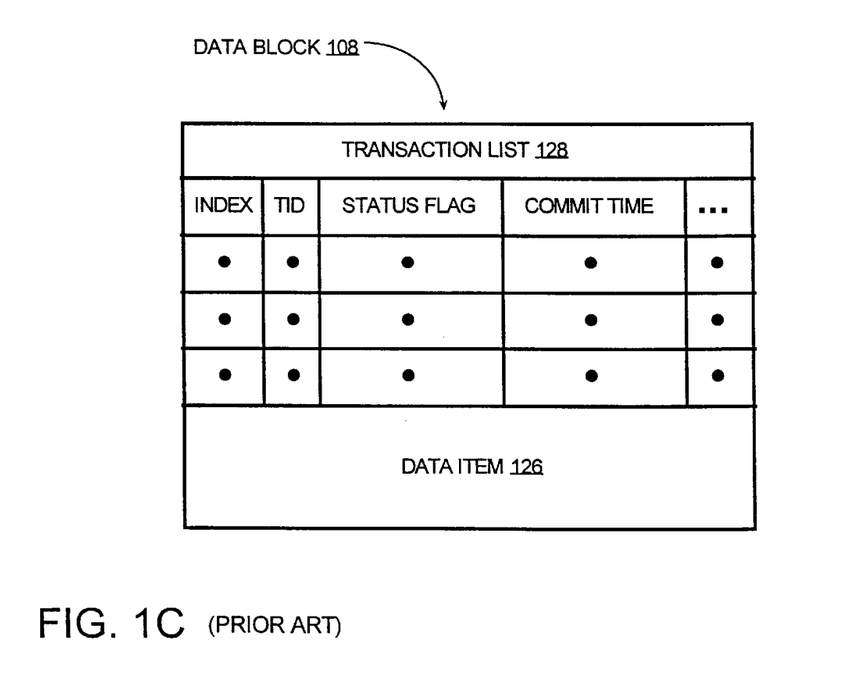
FIG. 1C is a block diagram that illustrates data block 108 of FIG. 1A in greater detail.

Each entry in the transaction list contains information about the transaction that corresponds to the entry. In the exemplary transaction list 128, each entry includes an index number for the entry, a transaction identifier ("TID") that uniquely identifies the transaction associated with the entry, a status flag that indicates whether the transaction is active or committed, and the commit time of the transaction if the transaction is marked as committed. The entries may also include other information, such as pointers to records that indicate how to undo the changes made to the data block by the transaction that corresponds to the entry.

Typically, an update operation involves updating both a data item in a data block and the transaction list of the data block. FIG. 1A illustrates the steps typically performed during an update operation. Referring to FIG. 1A, a transaction 104 specifies an update to a data item 126 that is stored in a data block 108 within a database 100. Before the transaction 104 can perform the update, the current version of the data block 108 must be loaded into a buffer cache 110 in dynamic memory 102. The transaction 104 then updates both the data item 126 in the data block 108 and the transaction list 128 in the data block 108. These updates create an updated version of the data block (data block 108') in the buffer cache 110.

The update to the transaction list 128 may include, for example, adding an entry to the transaction list 128 to indicate that transaction 104 has updated data block 108. At the time transaction 104 makes the update to data block 108, transaction 104 will be active. Consequently, the entry added to transaction list 128 will not indicate a commit time for transaction 104.

Typically, an updated data block is not immediately written from buffer cache 110 back to disk. In fact, updated data blocks may remain in the buffer cache 110 even after the transaction that made the update has committed. However, memory 102 is dynamic. Therefore, a power failure may cause all of the information stored in memory 102 to be lost. For security reasons, it is important for the database 100 to reflect all of the changes made by a transaction that has committed. To ensure that none of the changes made by committed transactions are lost, many databases support redo-based recovery mechanisms.

As explained above, redo-based recovery involves generating a redo record when a transaction modifies a data block that is stored in buffer cache 110. The redo record generated during an update operation contains the information required to reperform the update operation. While a transaction is active, the redo records generated in response to updates made by the transaction may be stored in dynamic memory 102. However, when the transaction commits, the redo records associated with the transaction are copied to a redo log 118 on a persistent storage device.

In the example illustrated in FIG. 1A, redo records 114 are generated in response to transaction 104 updating data block 108. These redo records 114 are copied to redo log 118 when transaction 104 commits, even though the updated data block 108' is not copied back to the non-volatile memory. If a power failure occurs after transaction 104 has committed, but before the updated data block 108' has been written back to the database 100, the redo record stored in redo log 118 may be used to perform the appropriate update to the version of data block 108 that is stored in database 100.

Because the transaction 104 is active at the time the transaction list 128 of data block 108 is updated and the associated redo record 114 is generated, neither the updated data block 108', nor the redo record 114 will indicate a commit time for transaction 104. The same will be true for all data blocks updated by transaction 104.

BLOCK CLEANOUT

In order for the transaction lists in all of the data blocks updated by transaction 104 to actually reflect the commit time of transaction 104, all of the data blocks that were updated by transaction 104 will have to be updated after transaction 104 commits to reflect the correct status and commit time of transaction 104. The operation of updating the transaction list of a data block with the commit time of a transaction that updated the data block is referred to as block cleanout. If a transaction updated thousands of data blocks, block cleanout must be performed on those thousands of data blocks after the transaction commits to indicate the commit time of the transaction.

Block cleanout may involve a significant amount of overhead. For example, if the updated data block has already been written back to disk, block cleanout would involve (1) obtaining a write lock on the data block, (2) loading the data block into the buffer cache, (3) updating the appropriate entry in the transaction list, (4) generating a redo record that reflects the change to the transaction list, and (5) writing the redo record to the redo log on the persistent storage device.

DELAYED BLOCK CLEANOUT

Because it is so expensive to update every data block that a transaction has changed with the commit time of the transaction, some database systems do not perform block cleanout when a transaction commits. Rather, the commit time of the transaction is simply stored elsewhere, and block cleanout is postponed to a later time.

For example, some database systems simply store the commit time of a transaction in an entry of a transaction table. An exemplary transaction table 120 is illustrated in FIG. 1B. Each entry in transaction table 120 corresponds to a transaction. Each entry includes a slot number and sequence number that are used to uniquely identify the transaction represented by the entry. In addition, each entry also includes a status flag to indicate the status of the corresponding transaction, and a field for the commit time of the corresponding transaction.

There is only one transaction table entry for any given transaction. Therefore, updating the transaction table entry of a transaction with the commit time of the transaction when the transaction commits involves significantly less overhead than updating the transaction lists of every data block that includes a data item that was updated by the transaction.

Because the transaction lists of the data blocks that were updated by a transaction are not updated when the transaction commits, the transaction list in any given data block does not necessarily reflect correct status information about the transactions that updated the data block. In such systems the responsibility for determining the actual status of the transactions listed in the transaction list 128 typically falls on the transaction that needs to know accurate information about the previous transactions, such as a transaction that wishes to perform a subsequent update to a data item in the data block.

Figure 1D:
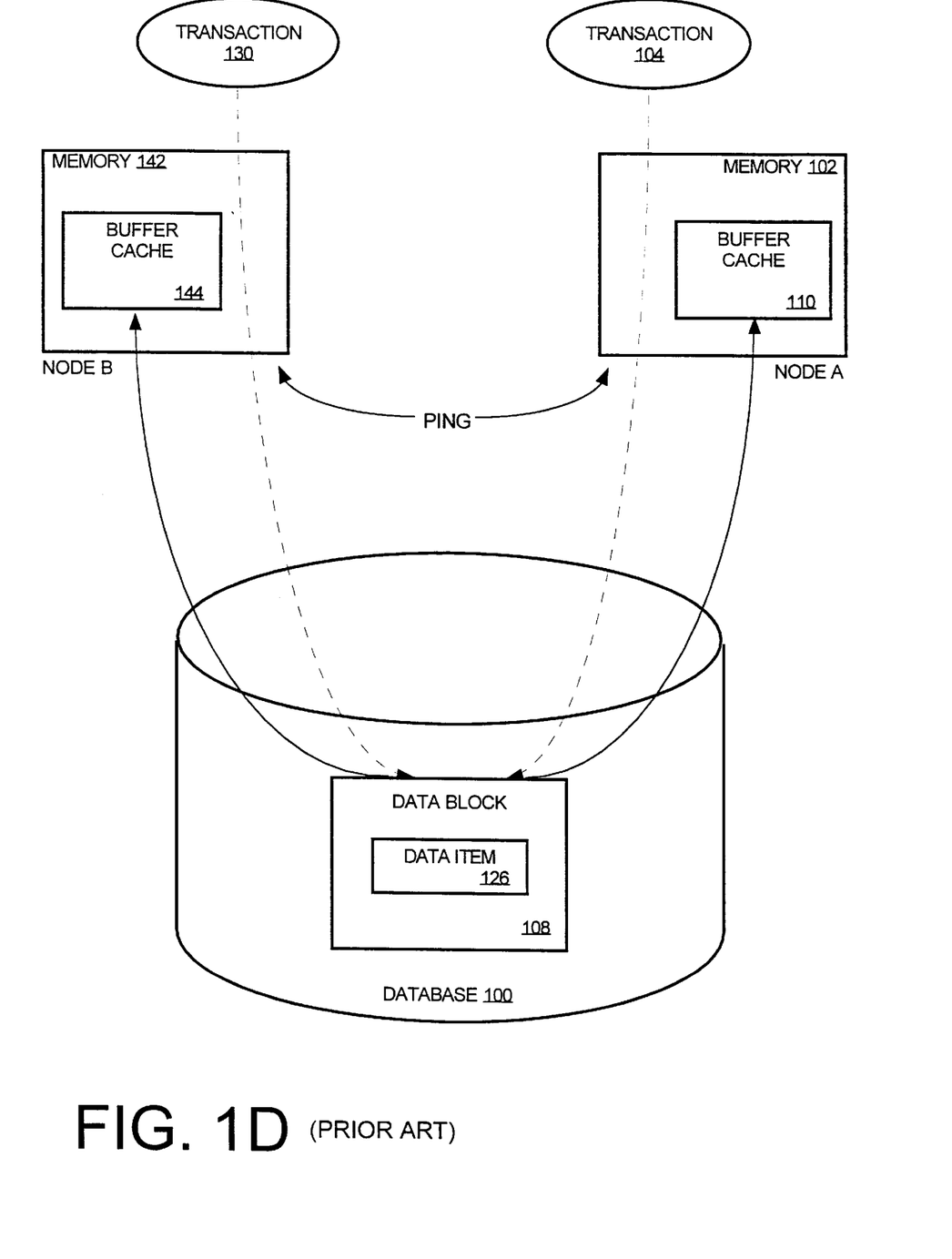
FIG. 1D is a block diagram illustrating a ping that occurs when a subsequent transaction must determine the status of a previous transaction based on information stored in a transaction table that is on a node that is remote to the subsequent transaction.

For example, assume that another transaction 130 wants to perform an update to data item 126 of data block 108, as shown in FIG. 1D. The information contained in the transaction list 128 may indicate that transaction 104 is active and holds a lock on data item 126. Transaction 130 then searches for the transaction table 120 that contains the entry for transaction 104 to determine whether transaction 104 is still active or whether it has committed. If the transaction table 120 indicates that transaction 104 has in fact committed, the subsequent transaction 130 proceeds to update the data item 126. The subsequent transaction 130 also updates the entry for transaction 104 in transaction list 128 to indicate that transaction 104 has committed, and the commit time of transaction 104.

While deferring block cleanout avoids the need to store the commit time in all of the updated data blocks when a transaction commits, it may involve a significant amount of overhead under certain conditions. Specifically, consider the circumstances shown in FIG. 1D, where transaction 104 is running on one node (Node A), and transaction 130 is running on a different node (Node B). Typically, the transaction table for transaction 104 would be stored in the buffer cache 110 of the node on which transaction 104 was executing. Transaction 130, which desires to update data item 126, must load the transaction table for transaction 104 into the buffer cache 144 of the node B on which it is executing so that it may determine from the entry for transaction 104 in the transaction table whether transaction 104 has already committed.

Circumstances such as this in which information stored in the buffer cache of one node is required by a transaction in another node are referred to as pings. Pings are typically very expensive, and often involve writing the information from one cache to disk, then from the disk to another cache, and numerous lock-related operations.

SELECTIVE BLOCK CLEANOUT

According to one aspect of the invention, the decision to defer block cleanout on a particular block hinges on whether block cleanout can be efficiently performed on the data block at the time the transaction that updated the data block commits. For example, it is relatively inefficient to perform block cleanout on data block 108' when transaction 104 commits if data block 108' has already been written back to database 100. However, if data block 108' still resides in buffer cache 110 when transaction 104 commits, it is relatively efficient to perform immediate block cleanout on data block 108'. The increased efficiency is due to the fact that the data block already resides in the buffer cache of the node that would be performing the block cleanout. Therefore, the overhead involved in allocating space within the buffer cache 110 and loading the data block from the database 100 is avoided.

For those data blocks that have been updated by a transaction and stored back to disk before the transaction commits, block cleanout is deferred. Thus, if data block 108' has already been written to database 100 before transaction 104 committed, data block 108' will not be cleaned out in response to transaction 104 committing. Rather, block cleanout of data block 108' will be performed by the next transaction that attempts to update or read data item 126. Such a deferred block cleanout operation will require the later transaction to load and inspect the transaction table that contains the entry for transaction 104, as described above.

BLOCK CLEANOUT WITHOUT GENERATING REDO

With respect to commit information, transaction tables may be designated as the source object and the transaction lists within data blocks may be treated as non-source objects. Thus, redo records must be generated for updates that change commit information in transaction tables. However, since the transaction lists within data blocks are non-source objects with respect to commit information, redo does not have to be generated for updates to the commit information in transaction lists within data blocks.

According to one aspect of the invention, redo information is not generated for the updates made to data blocks during non-deferred block cleanout operations. Thus, if data block 108' is still in buffer cache 110 when transaction 104 commits, the commit status and commit time of transaction 104 are written into the appropriate transaction list entry of data block 108' without generating any redo information to reflect this change to data block 108'.

The redo information is generated at a later time when a subsequent transaction accesses the information in data block 108'. The redo for the deferred block cleanout is generated without referring to the transaction table because all the information needed to generate the redo is already cached in the data block. If the subsequent transaction performs an update, the redo for the deferred block cleanout is generated along with the redo for the update.

Because no redo information is generated during the non-deferred block cleanout, non-deferred block cleanout requires less overhead. However, the commit status and commit time of transaction 104 that were added to the updated data block 108' will be lost if a node failure occurs before data block 108' is written back to database 100. If a failure does occur, the database system would recover from the failure by applying the redo records 114 to the old version of the data block 108. After application of redo records 114, data block 108 will reflect changes made by transaction 104 but will not reflect the correct status or commit time of transaction 104, since no redo records were generated for this information.

Under these conditions, a transaction that subsequently attempts to update data item 126 will encounter inaccurate information about transaction 104 in the transaction list 128.

According to one embodiment of the invention, the later transaction will simply revert to the deferred block cleanout techniques under these circumstances. Specifically, the later transaction inspects the transaction table entry for transaction 104 (the source object) to determine the correct status of transaction 104, and adds the correct status information to the data block if the status information in the data block is not correct.

Figure 3:
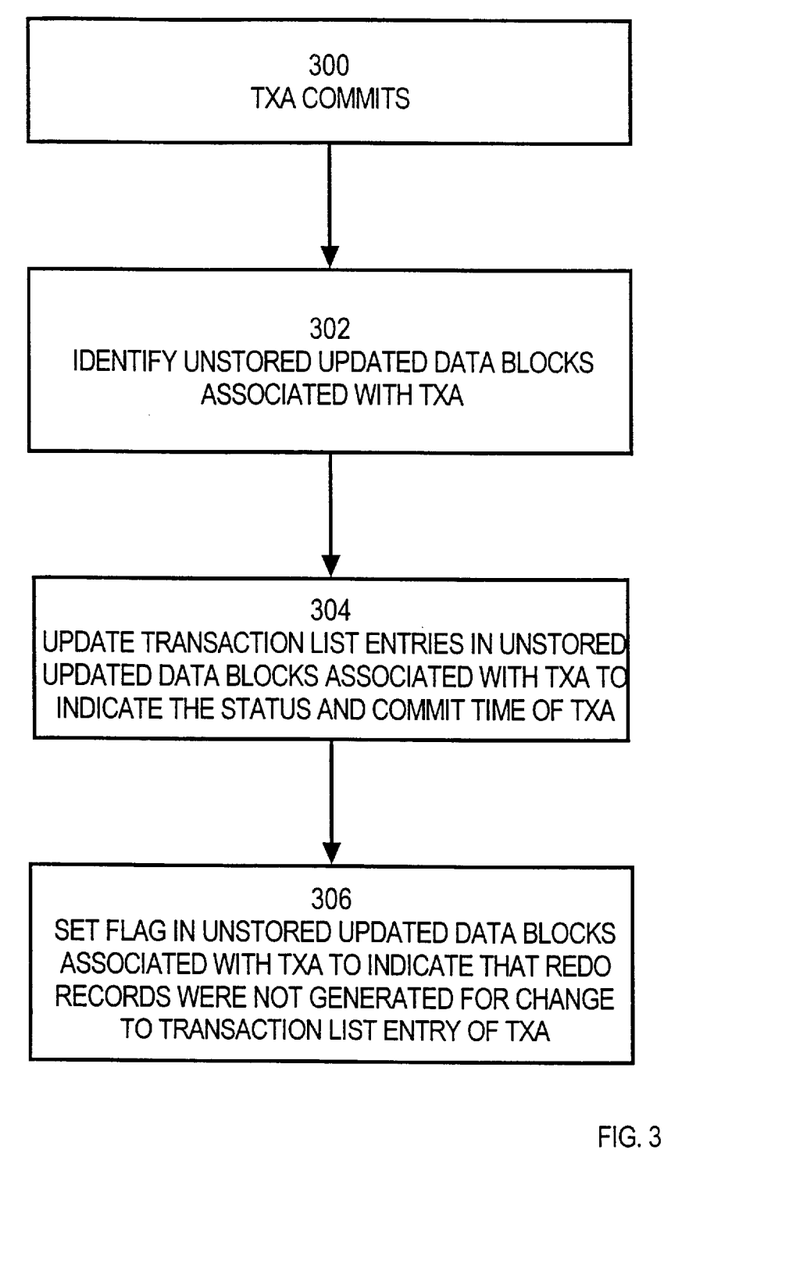
FIG. 3 is a flow chart that illustrates the steps performed when a transaction commits according to an embodiment of the invention.

FIG. 3 is a flowchart that illustrates the steps performed when a transaction commits according to one embodiment of the invention. At step 300, a transaction (TXA) commits. At step 302, the unstored updated data blocks associated with TXA are identified. The unstored updated data blocks associated with TXA are the data blocks that were updated by TXA that are still located in the buffer cache of the node that executed TXA.

At step 304, the transaction list entries for transaction TXA that are in the unstored updated data blocks associated with transaction TXA are updated to indicate the status and commit time of TXA. During this update, no redo information is generated.

At step 306, a flag in each of the unstored updated data blocks associated with TXA is set to indicate that redo information was not generated for the change to the transaction list entry associated with TXA. Typically, steps 304 and 306 would be performed together for each data block. For example, if transaction TXA updated data block 108 and data block 108 still resided in the buffer cache of the node that executed TXA at the time that TXA commits, a single operation would be used to write the commit time and status of transaction TXA into the transaction list entry for transaction TXA and set the flag in data block 108 to indicate that no redo information was generated for the change made to the transaction list entry for TXA.

Figure 4A:
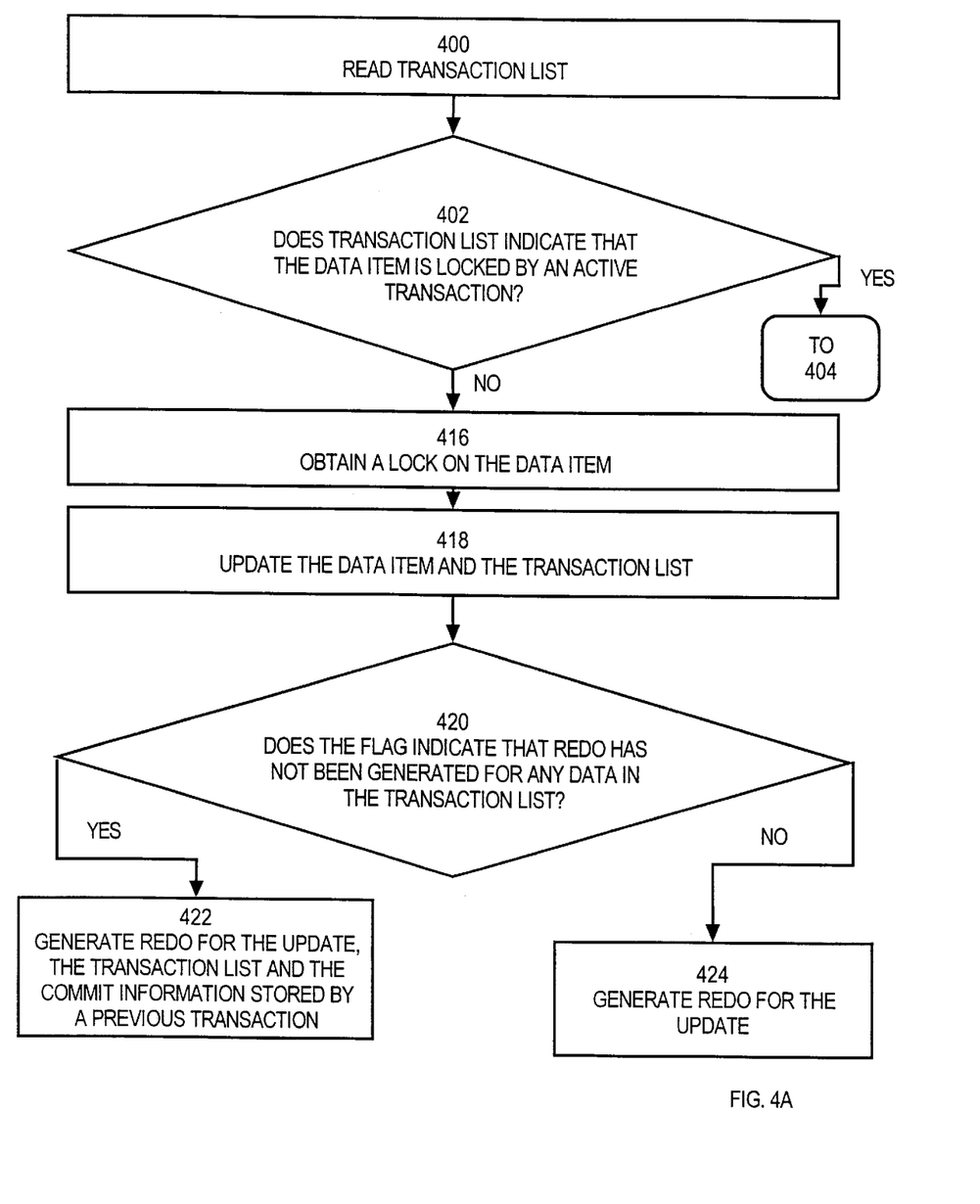
FIG. 4A is a portion of a flow chart that illustrates the steps performed when a transaction specifies an update to a data item according to an embodiment of the invention.
Figure 4B:
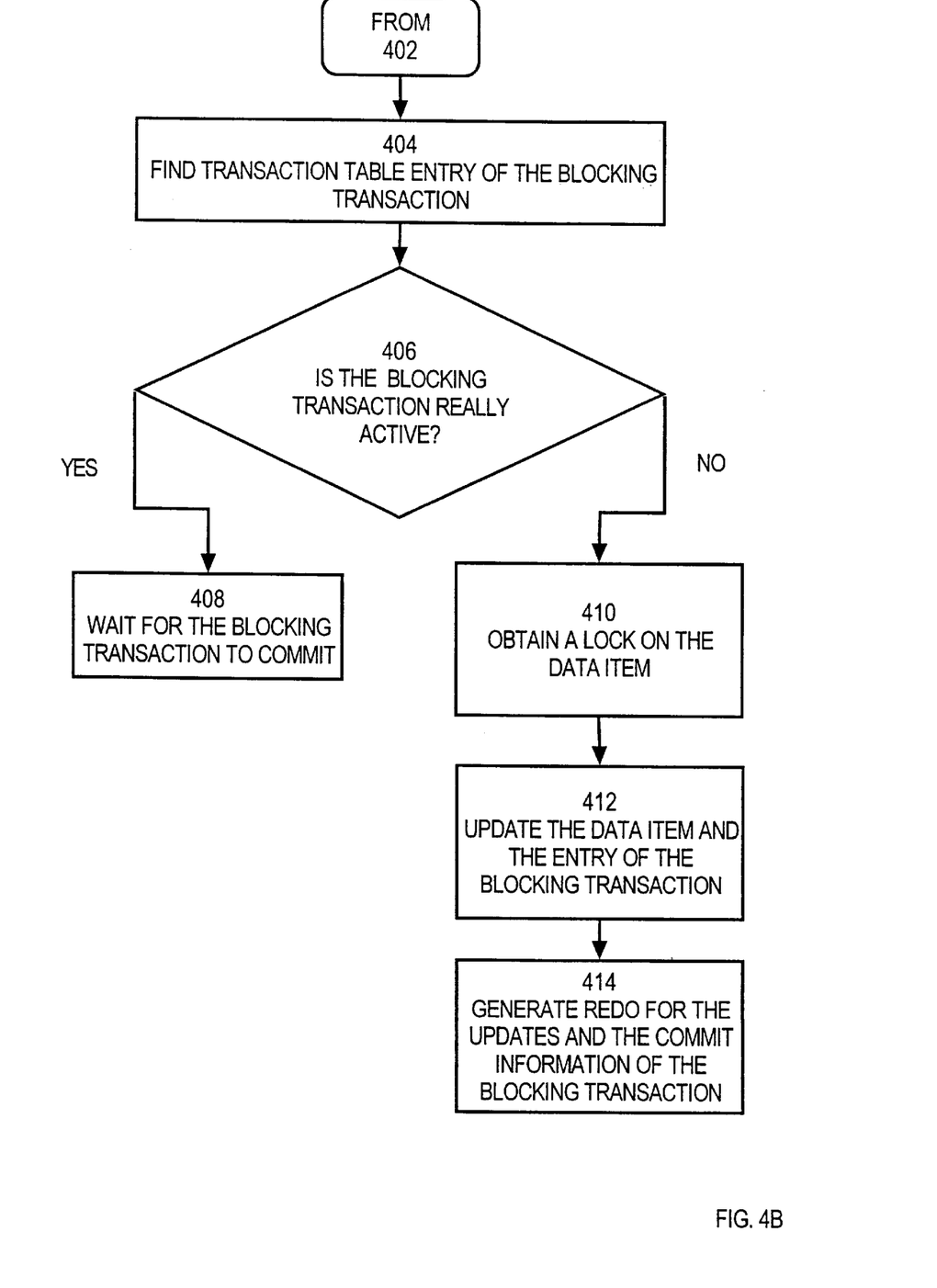
FIG. 4B is a portion of the flow chart illustrated in FIG. 4A.

FIGS. 4A and 4B contain a flowchart that illustrates the steps performed by a transaction that desires to update a data item ("target data item") in a data block according to an embodiment of the invention. At step 400, the transaction list that is stored in the data block that contains the target data item is read. At step 402, it is determined whether the transaction list indicates that the target data item is locked by an active transaction. If the transaction list indicates that the target data item is locked by an active transaction, control passes to step 404. Otherwise, control passes to step 416.

At step 404, the transaction table entry associated with the transaction that holds the lock on the target data item (the "blocking transaction") is loaded into the buffer cache and inspected. At step 406 it is determined whether the blocking transaction is really active based on the information contained in the transaction table entry for the blocking transaction. If the blocking transaction is really active, control passes to step 408. At step 408, the transaction waits for the blocking transaction to commit.

If the blocking transaction has committed, control passes to step 410. At step 410, a lock on the data item is obtained. At step 412, the data item itself is updated and the entry in the transaction list associated with the blocking transaction is updated to reflect that the blocking transaction is actually committed and to indicate the commit time of the blocking transaction.

At step 414, redo information is generated for the changes made at step 412. Specifically, redo information is generated to reflect both the update to the data item and to reflect the commit information of the blocking transaction.

As mentioned above, if the transaction list does not indicate that the target data item is locked by an active transaction, control passes to step 416. At step 416, a lock is obtained on the target data item. At step 418, the target data item is updated and the entry in the transaction list associated with the transaction that is making the update is updated. At step 420, it is determined whether a flag within the data block indicates that redo has not been generated for any data in the transaction list. Redo will not have been generated for data in the transaction list if a non-deferred block cleanout was performed on the data block without generating redo information. If the data block does not contain a flag that indicates redo was not generated for any data in the transaction list, control passes to step 424. Otherwise, control passes to step 422.

At step 424, redo is generated for the update to the data block made by the updating transaction. At step 422, redo information is generated for the changes made to the block by the updating transaction, and for the change made to the transaction list during the non-deferred block cleanout that was performed on the data block by an earlier transaction. Thus, the updating transaction generates redo information for changes that a previous transaction made to the data block as well as for the changes that it made itself.

If an updated data block is in the buffer cache when the updating transaction committed and no crash occurs before the updated data block is written to disk, then the overhead associated with deferred block cleanout is avoided. The only overhead incurred by a subsequent transaction is the minimal overhead required to generate redo information for the change made by the non-deferred block cleanout operation. If the subsequent transaction performs its own update to the block, then the overhead is insignificant because the subsequent transaction will already be generating redo information for the update it is performing. If an updated data block has been stored back to disk before the updating transaction commits, or if a crash occurs before the updated data block is written to disk, a subsequent transaction will experience no more overhead than that already associated with conventional deferred block cleanout operations.

It should be noted that logging for non-deferred block cleanout operations may be performed by any subsequent transaction that uses the unlogged information in the data block. In the example given above, the subsequent transaction that performs the redo logging is a transaction that desires to update the same data item as the previous transaction. However, the unlogged information (the status and commit time of the previous transaction) may also be used by transactions that read the data item. In these circumstances, the reader transaction may generate a redo record for the unlogged information even though the reader transaction itself makes no change to the data block.

Using the block cleanout strategy described above, block cleanout may be performed without having to reload and update all of the data blocks updated by a transaction when the transaction commits. Further, by caching commit times in data blocks, block cleanout no longer requires subsequent transactions to always search for, transfer and inspect the transaction table entries for previous transactions in order to determine whether the previous transactions are still active.

Using the block cleanout strategy described above, information is effectively cached in unrecoverable objects. Specifically, subsequent readers can read the cached, unrecoverable information (commit time and commit status information) from non-source objects (transaction lists of data blocks) without referring to recoverable source objects (transaction tables).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of recovering an object that includes a particular set of data, the method comprising the steps of:

making a change to a copy of said object, wherein said copy of said object resides in volatile memory;

if said change does not change any data within said object other than said particular set of data, then making said change to said copy of said object without generating redo information;

if said change changes any data within said object other than said particular set of data, then generating redo information in response to said change; and storing said redo information on non-volatile storage; and after a failure, using said redo information to restore all data within said object other than said particular set of data.

2. The method of claim 1 wherein:

a second object contains at least a portion of said particular set of data;

the method further includes the steps of:

making a second change to a copy of said second object, wherein said copy of said second object resides in volatile memory;

if said second change changes said portion of said particular set of data, then generating second redo information that reflects said second change; and storing said second redo information on non-volatile storage; and after a failure, using said second redo information to restore said portion of said particular set of data within said second object.

3. The method of claim 2 wherein:

said object is a data block;

said second object is an object associated with a particular transaction;

said particular set of data includes a commit time of said particular transaction;

the step of making a change to a copy of said object includes writing said commit time into a copy of said data block; and the step of making a second change to a copy of said second object includes writing said commit time into said object associated with said particular transaction; and the step of using said second redo information to restore said portion of said particular set of data within said second object includes using said second redo information to write said commit time into said object associated with said particular transaction.

4. The method of claim 1 wherein:

making a second change to a copy of said object, wherein said second change changes data within said object other than said particular set of data;

in response to said second change, performing the steps of generating second redo information that reflects both said second change and any previous change to said particular set of data within said object for which redo information has not yet been generated; and durably storing said second redo information.

5. The method of claim 4 further comprising the step of restoring said particular set of data within said object based on said second redo information after a failure.

6. The method of claim 4 wherein:
the step of making a change is performed in response to a first transaction; and
the step of making a second change is performed in response to a second transaction that is different from said first transaction.

7. A method for recovering objects in a database system that includes a plurality of objects, wherein each object of said plurality of objects stores a particular set of data, the method comprising the steps of:
performing a first update that changes said particular set of data in a copy of a first object of said plurality of objects, wherein said copy of said first object resides in volatile memory;
in response to said first update, generating a redo record that reflects said first update;
storing said redo record on non-volatile storage; and
performing a second update that changes said particular set of data in a copy of a second object of said plurality of objects without generating a redo record that reflects said second update, wherein said copy of said second object resides in volatile memory.

8. The method of claim 7 further comprising the steps of:
after a failure, performing the steps of:
recovering said particular set of data within said first object based on said redo record; and
recovering data within said second object other than said particular set of data based on durably stored redo information.

9. The method of claim 7 further comprising the steps of:
performing a third update that changes data within said copy of said second object other than said particular set of data;
in response to said third update, generating a second redo record that reflects both said second update and said third update; and
storing said second redo record on non-volatile storage.

10. The method of claim 9 further comprising the step of, after a failure, recovering said second object based on said second redo record.

11. The method of claim 7 wherein:
the second update is made in response to a first transaction;
the method further comprises the steps of:
reading said particular set of data from said copy of said second object in response to a second transaction that is different from said first transaction;
in response to reading said set of data, generating a second redo record that reflects said second update; and
storing said second redo record on non-volatile storage.

12. A computer-readable medium having stored thereon sequences of instructions for recovering an object that includes a particular set of data, the sequences of instructions including sequences of instructions for performing the steps of:
making a change to a copy of said object, wherein said copy of said object resides in volatile memory;
if said change does not change any data within said object other than said particular set of data, then making said change to said copy of said object without generating redo information;
if said change changes any data within said object other than said particular set of data, then
generating redo information in response to said change; and
storing said redo information on non-volatile storage; and
after a failure, using said redo information to restore all data within said object other than said particular set of data.

13. The computer-readable medium of claim 12 wherein:
a second object contains at least a portion of said particular set of data;
the sequences of instructions further include sequences of instructions for performing the steps of:
making a second change to a copy of said second object, wherein said copy of said second object resides in volatile memory;
if said second change changes said portion of said particular set of data, then
generating second redo information that reflects said second change; and
storing said second redo information on non-volatile storage;
and
after a failure, using said second redo information to restore said portion of said particular set of data within said second object.

14. The computer-readable medium of claim 13 wherein:
said object is a data block;
said second object is an object associated with a particular transaction;
said particular set of data includes a commit time of said particular transaction;
the step of making a change to a copy of said object includes writing said commit time into a copy of said data block; and
the step of making a second change to a copy of said second object includes writing said commit time into said object associated with said particular transaction; and
the step of using said second redo information to restore said portion of said particular set of data within said second object includes using said second redo information to write said commit time into said object associated with said particular transaction.

15. The computer-readable medium of claim 12 wherein the sequences of instructions further include sequences of instructions for performing the steps of:
making a second change to a copy of said object, wherein said second change changes data within said object other than said particular set of data;
in response to said second change, performing the steps of
generating second redo information that reflects both said second change and any previous change to said particular set of data within said object for which redo information has not yet been generated; and
durably storing said second redo information.

16. The computer-readable medium of claim 15 further comprising sequences of instructions for performing the step of restoring said particular set of data within said object based on said second redo information after a failure.

17. The computer-readable medium of claim 15 wherein:
the step of making a change is performed in response to a first transaction; and
the step of making a second change is performed in response to a second transaction that is different from said first transaction.

18. A method for performing block cleanout, comprising the steps of:

in response to executing a transaction, performing a first update to a data block that is stored in dynamic memory, the first update including a change to a data item in the data block, and information that identifies said transaction;

generating a redo record that reflects said first update;

when said transaction commits, performing the steps of:
  writing said redo record to a non-volatile memory; and
  if said data block has not been written to a non-volatile memory after performing said first update, then making a second update to said data block, the second update including data that identifies a commit time of said transaction.

19. The method of claim 18 wherein the step of making said second update is performed without generating a second redo record to reflect said second update.

20. The method of claim 19 wherein the step of making said second update includes writing data that indicates that said second update is not reflected in any undo record to said data block.

21. The method of claim 20 further comprising the steps of:

performing a third update to the data block in response to executing a second transaction, the third update including
  a change to a data item in the data block, and
  information that identifies said second transaction; and
generating a redo record that reflects said third update and the second update.

22. The method of claim 21 further comprising the step of storing the redo record that reflects said third update and the second update when the second transaction commits.

23. The method of claim 18 further including the step of if said data block has been written to a non-volatile memory after performing said first update, then not updating the data block with the commit time of said transaction when said transaction commits.

24. A method for providing information about a first transaction to a second transaction, wherein the second transaction specifies an update to a data block after the first transaction has updated the data block, the method comprising the steps of:

maintaining a record associated with said first transaction separate from said data block;

in response to committing said first transaction, performing the steps of
  updating said record with said information about said first transaction; and
  if said data block is has not been written to a non-volatile memory after said first transaction updated said data block, then storing said information about said first transaction in said data block;

causing said second transaction to read said data block before performing said update to said data block; and if said data block does not contain said information about said first transaction, then causing said second transaction to read said information about said first transaction from said record.

25. The method of claim 24 wherein the step of storing said information about said first transaction in said data block is performed without generating redo information.

26. The method of claim 25 further comprising the steps of:

if said data block is has not been written to a non-volatile memory after said first transaction updated said data block, then marking said data block to indicate that no redo information has been generated for storing said information about said first transaction in said data block; and causing said second transaction to determine whether said data block is marked to indicate that no redo information has been generated for storing said information about said first transaction in said data block; and if said data block is marked to indicate that no redo information has been generated for storing said information about said first transaction in said data block, then causing said second transaction to generate redo information for storing said information about said first transaction in said data block.

27. The method of claim 24 further comprising the step of if said data block does not contain said information about said first transaction, then causing said second transaction to update said data block with said information about said first transaction.

28. The method of claim 24 further comprising the step of if said data block does contain said information about said first transaction, then causing said second transaction to generate redo information for storing said information about said first transaction in said data block.

29. The method of claim 24 wherein:

said information about said first transaction includes a commit time of said first transaction;

the step of updating said record with said information about said first transaction includes updating said record with said commit time of said first transaction; and the step of storing said information about said first transaction in said data block includes storing said commit time of said first transaction in said data block.

30. The method of claim 24 wherein:

the method further comprises the step of maintaining at least one transaction table that has entries that correspond to transactions;

the record associated with said first transaction is an entry in said at least one transaction table; and the step of updating said record with said information about said first transaction includes writing said information about said first transaction into said entry of said at least one transaction table.

31. A computer-readable medium having stored thereon sequences of instructions for providing information about a first transaction to a second transaction, wherein the second transaction specifies an update to a data block after the first transaction has updated the data block, the sequences of instructions including instructions for performing the steps of:

maintaining a record associated with said first transaction separate from said data block;

in response to committing said first transaction, performing the steps of
  updating said record with said information about said first transaction; and
  if said data block is has not been written to a non-volatile memory after said first transaction updated said data block, then storing said information about said first transaction in said data block;

causing said second transaction to read said data block before performing said update to said data block; and if said data block does not contain said information about said first transaction, then causing said second transaction to read said information about said first transaction from said record.

32. The computer-readable medium of claim 31 wherein the step of storing said information about said first transaction in said data block is performed without generating redo information.

33. The computer-readable medium of claim 32 further comprising the steps of: if said data block is has not been written to a non-volatile memory after said first transaction updated said data block, then marking said data block to indicate that no redo information has been generated for storing said information about said first transaction in said data block; and causing said second transaction to determine whether said data block is marked to indicate that no redo information has been generated for storing said information about said first transaction in said data block; and if said data block is marked to indicate that no redo information has been generated for storing said information about said first transaction in said data block, then causing said second transaction to generate redo information for storing said information about said first transaction in said data block.

34. The computer-readable medium of claim 31 further comprising instructions for performing the step of if said data block does not contain said information about said first transaction, then causing said second transaction to update said data block with said information about said first transaction.

35. The computer-readable medium of claim 31 further comprising instructions for performing the step of if said data block does contain said information about said first transaction, then causing said second transaction to generate redo information for storing said information about said first transaction in said data block.

36. The computer-readable medium of claim 31 wherein:

said information about said first transaction includes a commit time of said first transaction;

the step of updating said record with said information about said first transaction includes updating said record with said commit time of said first transaction; and the step of storing said information about said first transaction in said data block includes storing said commit time of said first transaction in said data block.

37. The computer-readable medium of claim 31 wherein:

the computer-readable medium further comprises instructions for performing the step of maintaining at least one transaction table that has entries that correspond to transactions;

the record associated with said first transaction is an entry in said at least one transaction table; and the step of updating said record with said information about said first transaction includes writing said information about said first transaction into said entry of said at least one transaction table.

* * * * *